United States Patent
Bishop et al.

(10) Patent No.: US 7,597,222 B2
(45) Date of Patent: Oct. 6, 2009

(54) SPARE TIRE ASSEMBLY AND CARGO BOX

(76) Inventors: Darrell Bishop, 753 Marron Way, Gardnerville, NV (US) 89460; Debra Sue Bishop, 753 Marron Way, Gardnerville, NV (US) 89460

( * ) Notice: Subject to any disclaimer, the term of this patent is extended or adjusted under 35 U.S.C. 154(b) by 668 days.

(21) Appl. No.: 11/126,669

(22) Filed: May 11, 2005

(65) Prior Publication Data

US 2006/0091167 A1    May 4, 2006

Related U.S. Application Data

(60) Provisional application No. 60/624,418, filed on Nov. 1, 2004.

(51) Int. Cl.
*B60R 9/00* (2006.01)
*B60R 7/00* (2006.01)

(52) U.S. Cl. .............. 224/42.21; 224/504; 224/505; 224/506; 224/516; 224/519; 224/489

(58) Field of Classification Search .......... 224/42.21, 224/519, 489, 516, 282, 520, 523, 504, 505, 224/506
See application file for complete search history.

(56) References Cited

U.S. PATENT DOCUMENTS

| | | | |
|---|---|---|---|
| 4,312,620 A | 1/1982 | Muschalek, Jr. | |
| 4,410,117 A * | 10/1983 | Crawford et al. | ............ 224/490 |
| 4,418,851 A | 12/1983 | Ankeny | |
| 4,485,945 A | 12/1984 | Ankeny | |
| 4,971,237 A * | 11/1990 | Davis | ............ 224/506 |
| 5,706,990 A | 1/1998 | Lahrson | |
| 5,746,275 A | 5/1998 | Cross et al. | |
| 5,964,492 A * | 10/1999 | Lyon | ............ 296/37.6 |
| 6,003,922 A * | 12/1999 | Giesey et al. | ............ 296/37.3 |
| 6,312,210 B1 | 11/2001 | Lang | |
| 6,425,510 B1 | 7/2002 | King | |
| 7,052,066 B2 * | 5/2006 | Emery et al. | ............ 296/37.1 |
| 7,118,053 B2 * | 10/2006 | Truan et al. | ............ 239/661 |
| 2005/0023315 A1 | 2/2005 | Skinner | |

* cited by examiner

*Primary Examiner*—Nathan J Newhouse
*Assistant Examiner*—Lester L Vanterpool

(57) ABSTRACT

An apparatus for carrying a spare tire is described. The apparatus is a spare tire assembly configured to interface with a vehicle hitch. The apparatus comprises a hitch receiver, a bumper frame, a spare tire holder, an adjustable bolt, and an adjust come. The hitch receiver is configured to interface with the hitch from a vehicle. The bumper frame is fixedly coupled to the hitch receiver. The bumper frame is on a horizontal axis. The spare tire holder is rotatably coupled to the bumper frame with a hinged element that is configured to swing vertically about the horizontal axis. The hinged element also includes an aperture or hole, which receives a locking pin that locks the spare tire holder in an upright position. The adjustable bolt and adjustable cone are configured to receive different size spare tires. When the spare tire holder is in a downward position, the user can have access to a cargo box. In one illustrative embodiment, the cargo box has a utility rack and includes doors that swing outwardly.

20 Claims, 5 Drawing Sheets

SPARE TIRE ASSEMBLY AND CARGO BOX

CROSS REFERENCE

This patent application is related to provisional patent application 60/624,418 having the same named inventors, filed on Nov. 1, 2004, which is hereby incorporated by reference.

BACKGROUND

1. Field of the Invention

This invention relates to a spare tire holder. More particularly, the invention relates to a spare tire holder that is mounted on a hitch receiver of a vehicle.

2. Description of Related Art

The all terrain vehicle ("ATV") has gained popularity during the last decade, and there are many different varieties and uses for ATV's. However, users of ATV's presently have no safe or secure way to store spare tires, gasoline, and other such items on an ATV. Users of ATV's have a particular need for spare tires, gasoline, accessories and other such items because these vehicles are frequently taken 40 to 50 miles off of paved roads and onto steep and rugged terrain that other vehicles cannot traverse. When the user ventures this far off the beaten track, it is unsafe to travel without a spare tire, gasoline, camping equipment and supplies. Because of the extreme movements and vibrations a vehicle faces when bouncing on unpaved trails and up and down steep terrain, items must be attached securely to the vehicle to prevent loss of the items or injury to the user.

Referring to FIG. 1 there is shown a view of an illustrative vehicle. The illustrative vehicle is an ATV sold under the trademark Rhino® by Yamaha Corporation, hereinafter referred to as a Rhino. The Rhino has a bed and a tailgate that swings vertically. The typical problem with this ATV is that it is difficult to securely position a spare tire in the bed of the vehicle because the spare tire takes up the vast majority of bed space. Additionally, the spare tire cannot be attached to the tailgate because the tailgate is made of a relatively weak material having a low tensile strength.

Prior art devices for carrying a spare tire cannot be easily attached to ATV's using standard equipment. These apparatuses for carrying a spare tire must be bolted or welded on to the vehicle. Bolting and welding requires the use of specialized tools, considerable strength, and a fair amount of time, which can act as a deterrent to the recreational user who may not have the time or the specialized tools to attach the spare tire carrying device properly.

Other devices that carry a spare tire attach to the bumper or tailgate of a vehicle. These devices provide a poor solution for an ATV because ATV's are subject to substantial vibration during off-road use. Additionally, ATV's do not typically have back bumpers. Thus, a device that may work effectively on a paved road will not work effectively in an off-road environment. Furthermore, these devices do not accommodate different size wheels and tires.

Additionally, the prior art fails to teach the combination of a spare tire holder and a cargo box located on the bed of an ATV. A cargo box is necessary to secure other items such as camping equipment, farming equipment, supplies, ammunition, water, gasoline and other such items that are typically stored in a cargo box. Generally, cargo boxes are not securely attached to the ATV. Therefore, there is a need to have a cargo box which can be securely attached to an ATV, and which permits a spare tire to be carried by the ATV.

SUMMARY

A spare tire assembly configured to interface with a vehicle hitch is described. The spare tire assembly comprises a hitch receiver, a bumper frame, a spare tire holder, an adjustable bolt, and an adjust cone. The hitch receiver is configured to interface with the hitch from a vehicle. The bumper frame is fixedly coupled to the hitch receiver. The bumper frame is on a horizontal axis. The spare tire holder is rotatably coupled to the bumper frame with a hinged element that is configured to swing vertically about the horizontal axis. The hinged element includes an aperture or hole, which receives a locking pin that locks the spare tire holder in an upright position. The adjustable bolt is slidably coupled to the spare tire holder and is configured to receive different sized spare tires. The adjust cone is coupled to the adjustable bolt and is configured to receive different sized wheels.

When the spare tire holder is in a downward position, the user can access a cargo box. The cargo box is configured to interface with a vehicle bed and is only accessible when the spare tire holder is in a downward position. In one illustrative embodiment, the cargo box includes doors that swing outwardly and a utility rack. In an alternative embodiment, the cargo box includes drawers.

DRAWINGS

The present invention will be more fully understood by reference to the following drawings which are for illustrative, not limiting, purposes.

DESCRIPTION

Persons of ordinary skill in the art will realize that the following description of the present invention is illustrative and not in any way limiting. Other embodiments of the invention will readily suggest themselves to such skilled persons having the benefit of this disclosure. It shall be appreciated by those of ordinary skill in the art that the apparatus described hereinafter may vary as to configuration and as to details. Additionally, the methods may vary as to details, order of the actions, or other variations without departing from the inventive concepts disclosed herein.

This patent describes a spare tire assembly attached to a vehicle. The illustrative vehicle is an all-terrain vehicle (ATV). Those skilled in the art shall appreciate that the references to an ATV should not be viewed as a limitation to the specifications and claims.

Figure 1:
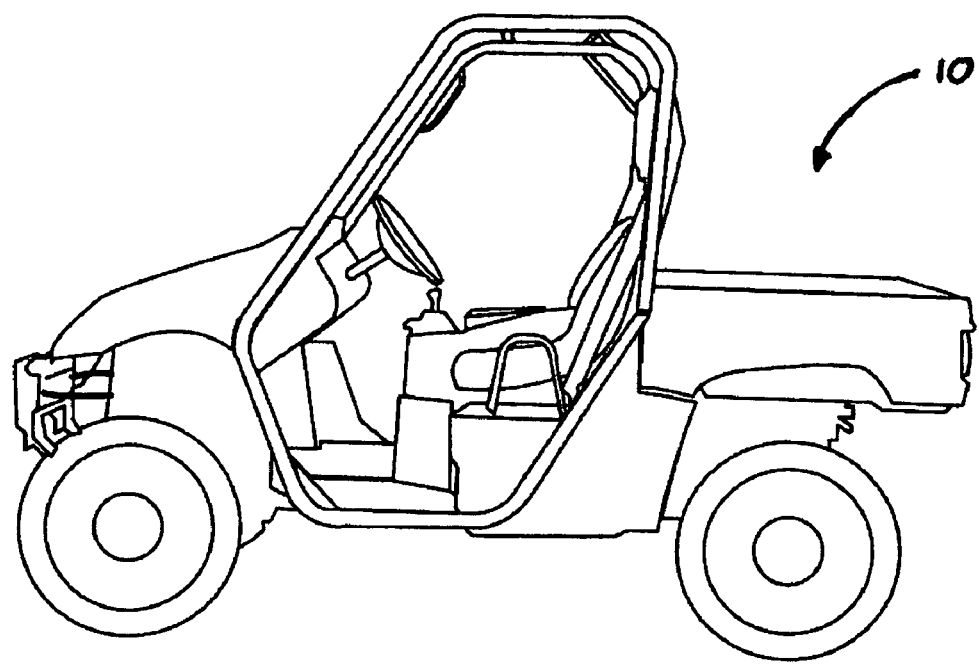
FIG. 1 shows a view of an illustrative vehicle.
Figures 2A, 2B:
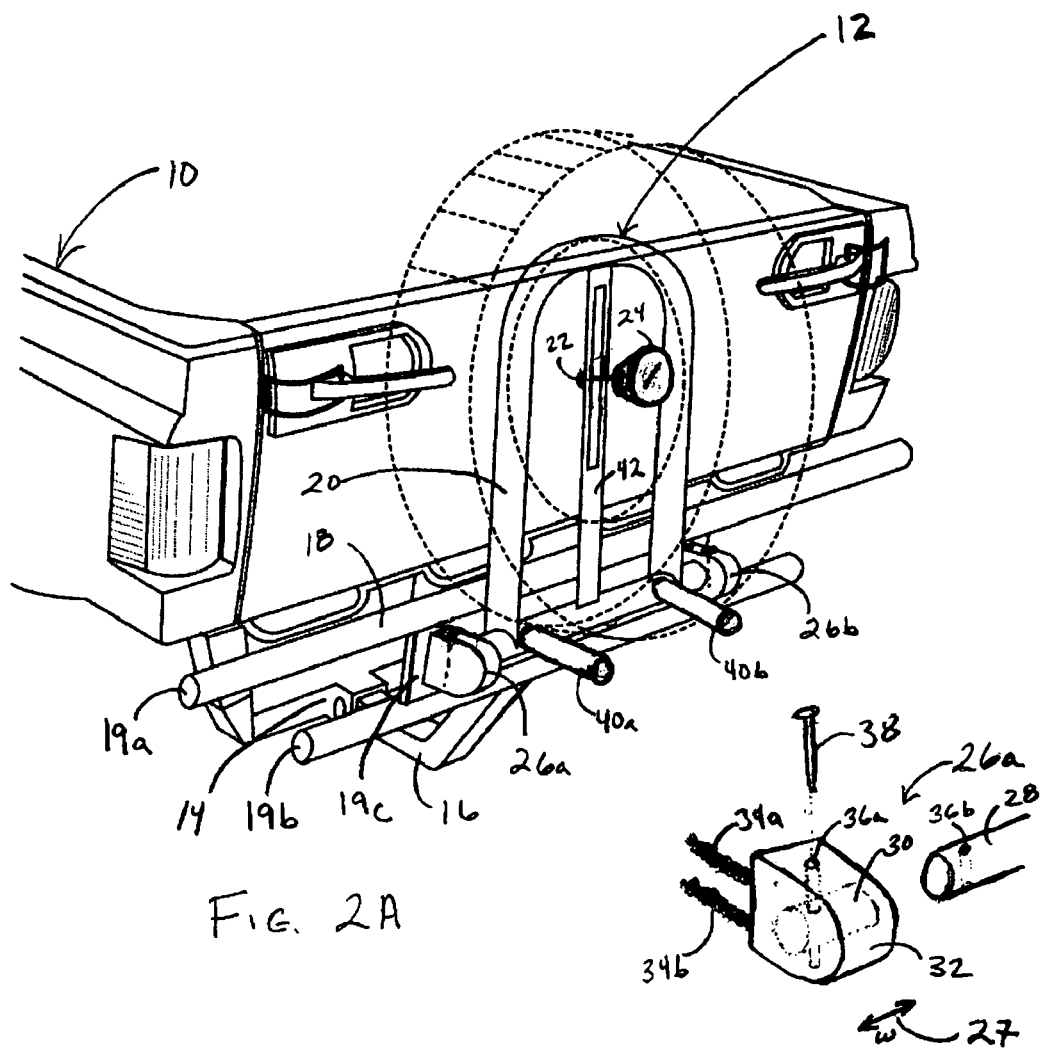
FIG. 2 shows an isometric view of the vehicle with a spare tire assembly in an upright position.

Referring to FIG. 2A there is shown an isometric view of a vehicle 10 with a spare tire assembly 12 in an upright position. The spare tire assembly 12 is configured to interface with the vehicle hitch 14. The apparatus comprises a hitch receiver 16, a bumper frame 18, a spare tire holder 20, an adjustable bolt 22, and an adjust cone 24. The spare tire assembly is configured to receive a spare tire of varying sizes. For purposes of this patent, a wheel is a circular frame of hard material that may be solid, partly solid, or spoked. A tire is a rubber cushion that fits around the wheel and usually contains compressed air. The spare tire comprises a wheel and a tire. Those skilled in the art shall appreciate that a spare tire can have varying size wheels and varying size tires. The spare tire assembly 12 accommodates spare tires of varying sizes.

The hitch receiver 16 is configured to interface with the hitch 14 from the vehicle 10. The hitch 14 connects either directly or indirectly to the frame of vehicle 10. The hitch 14 includes an aperture and is configured to receive a connecting bolt (not shown), which is used to fasten the hitch to the hitch receiver 16. The connecting bolt is a fastener consisting of a threaded pin or rod with a head at one end, designed to be inserted through holes in assembled parts and secured by applying torque. By way of example and not of limitation, the vehicle 10 is an all terrain vehicle such as the Rhino described above. The illustrative ATV has a standard 2-inch receiver hitch.

The bumper frame 18 is fixedly coupled to the hitch receiver 16. The bumper frame 18 comprises a bar or bars usually made of metal or plastic, which absorb impact and distribute loads or stresses from carrying the spare tire assembly 12. The illustrative bumper frame 18 is on a horizontal axis and comprises two longitudinal members 19a, 19b and a web 19c fixedly coupled between the members. In the illustrative embodiment, the vehicle bed has a low tensile strength because the bed is made of plastic and provides little structural integrity. The bars or longitudinal members protect the length of the back of the vehicle and distribute the load from the spare tire holder 20. In the illustrative embodiment, one member 19a spans the width of the vehicle 10 and the other second member spans 19b the width of the tailgate. The web 19c connects the first member 19a to the second member 19b.

The spare tire holder 20 is rotatably coupled to the bumper frame 18 with hinged elements 26a and 26b. The hinged elements 26a and 26b swing vertically about a horizontal axis. The hinged elements 26a and 26b are configured to absorb the vibrations from off-road conditions, and are relatively wide. In a relatively broad embodiment, the hinged element has a width 27 that ranges from 0.25 inches to 10 inches. In a more limiting embodiment, the hinged element has a width 27 that ranges from 0.5 inches to 5 inches. In a more limiting embodiment, the hinged element has a width 27 that ranges from 1 inch to 3 inches. In an illustrative embodiment, the hinged element has a width of approximately 2 inches.

A detailed view of an illustrative hinged element 26a is provided in FIG. 2B. The illustrative hinged element 26a is a coupling of a shaft 28 extending from the spare tire holder 20 through an orifice 30 within a docking joint 32 having fasteners 34a and 34b, e.g. screws, disposed on a flat face of the docking joint. The fasteners 34a and 34b are used to fixedly couple the docking joint 32 to the web 19c The docking joint 32 is configured to receive the shaft 28 in a relatively "snug" manner. A lubricant such as oil is used to permit the shaft 28 to rotate about the docking joint 32.

The illustrative hinged element 26a also includes an aperture 36a and 36b, which receives a locking pin 38. The aperture 36a is associated with the docking joint 32 and the aperture 36b is associated with the shaft 28. The locking pin 38 locks the spare tire holder in an upright position. The locking pin 38 is a short, cylindrical piece of metal, which holds the spare tire holder in an upright position. In the illustrative embodiment, the hinged element 26b is also configured to receive a locking pin. When the locking pins are removed from each of the hinged elements 26a and 26b, the spare tire holder goes into a downward position, which permits access to the tailgate of the vehicle.

The spare tire assembly 12 is configured to receive different sized spare tires. The illustrative spare tire is placed on the tire rests 40a and 40b, which are fixedly coupled to the spare tire holder 20. The spare tire holder 20 is configured to receive different sized spare tires having different wheel sizes. The different sized spare tires are secured with the adjustable bolt 22 that is fed through a slotted plate 42. The adjustable bolt is slidably coupled to the spare tire holder 20 and is secured with the adjust cone 24. The adjust cone 24 is configured to receive different sized wheels.

Figure 3:
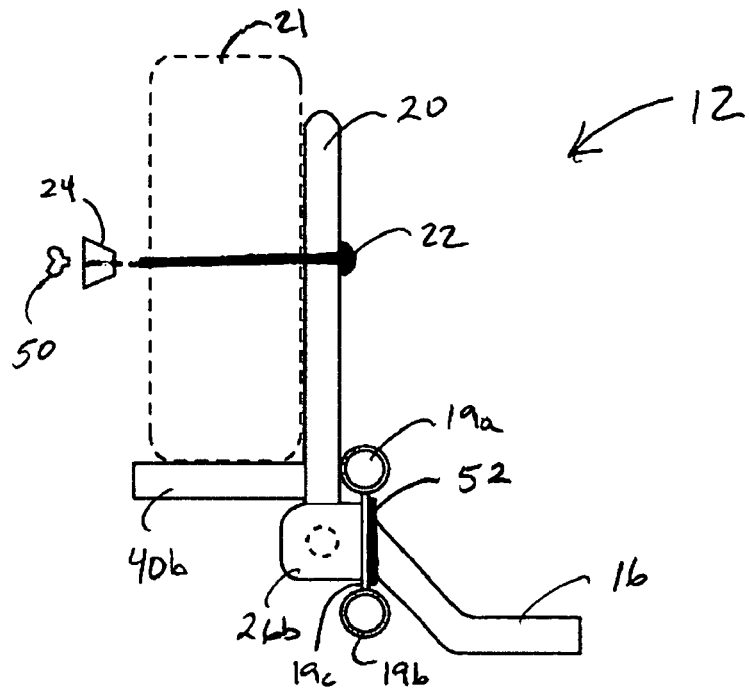
FIG. 3 shows a side view of the spare tire holder assembly in an upright position.

Referring to FIG. 3 there is shown a side view of the spare tire assembly 12 in an upright position. The hitch receiver 16 has an associated hitch receiver plate 52 which is fixedly coupled to the web 19c between the longitudinal members 19a and 19b. In the illustrative embodiment, the hitch receiver plate is fastened to the web 19c, which has a plurality of holes.

The side view of FIG. 3 shows the illustrative spare tire 21 coupled to the spare tire holder 20. The spare tire 21 is attached to the spare tire holder 20 with the adjust cone 24 and wing nut 50, which receives the adjustable bolt 22. The illustrative adjust cone 24 is conical in shape and is configured to receive or interface with the central opening of different sized wheels. The spare tire 21 is also supported by one or more tire rests 40b, which are perpendicular to the spare tire holder 20. The illustrative tire rest 40b is welded to the spare tire holder 20.

Figure 4:
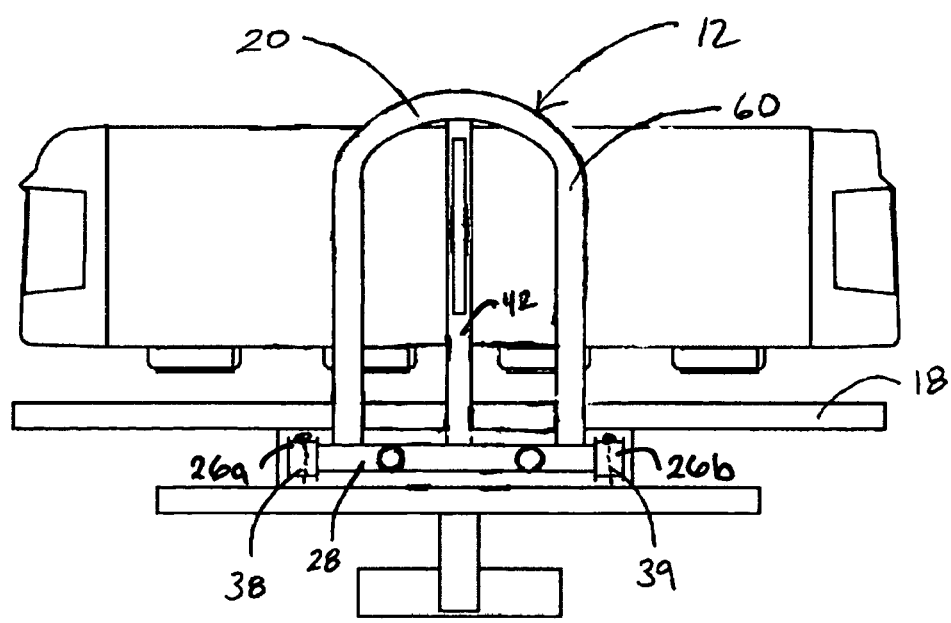
FIG. 4 shows a front view of the spare tire holder assembly in an upright position.

Referring to FIG. 4 there is shown a front view of the spare tire assembly 12 in an upright position. The spare tire assembly 12 is shown without the adjustable bolt 22, adjust cone 24, the wing nut 50, and the spare tire 21. The spare tire holder 20 is in an upright position due to locking pins 38 and 39 being received by the hinge elements 26a and 26b. The slotted plate 42 is fixedly coupled to the shaft 28 and the U-shaped member 60. The U-shaped member 60 and the bisecting slotted plate 42 support the weight of the secured spare tire 21 (not shown). When the locking pins 38 and 39 are removed from the hinge elements 26a and 26b, respectively, the U-shaped member 60 and the slotted plate 42 rotate vertically along a horizontal axis to a downward position that allows a tailgate at the back of the vehicle to swing open.

Figure 5:
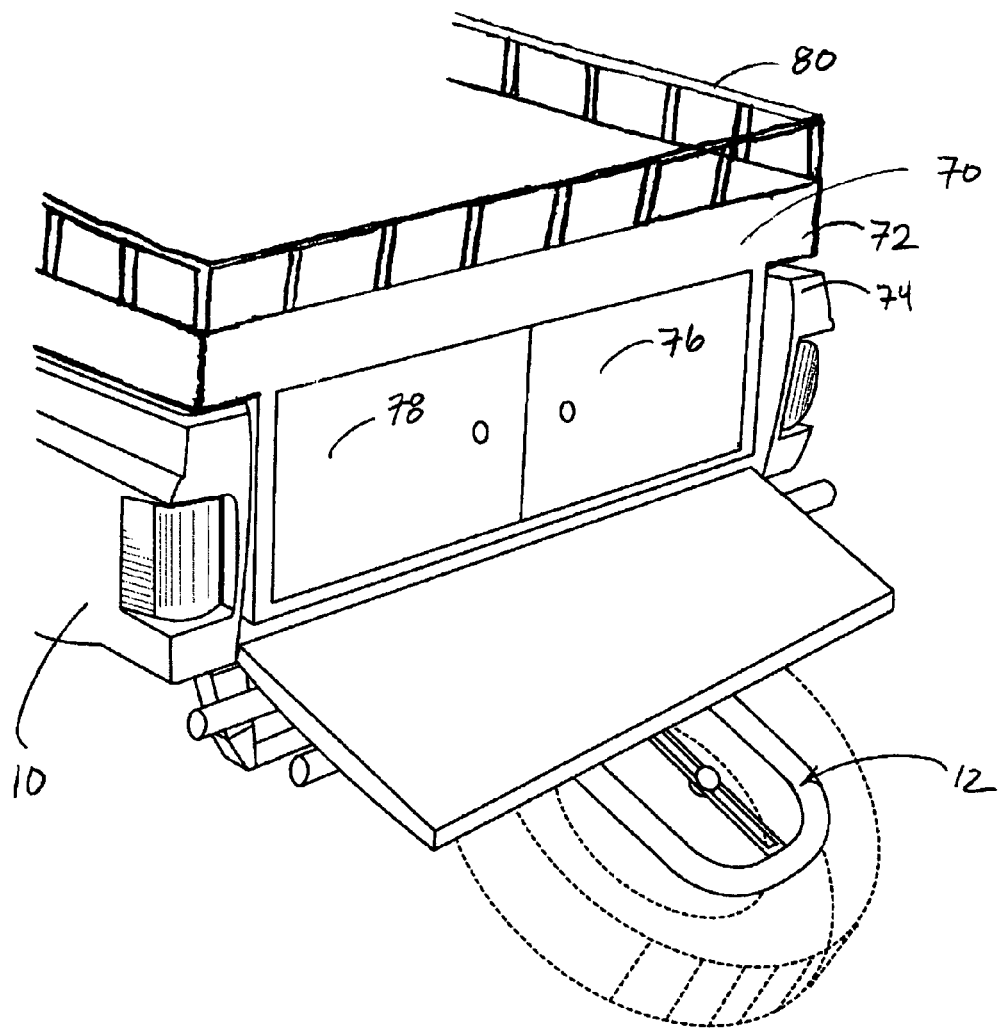
FIG. 5 shows an isometric view of the spare tire assembly in downward position, which permits access to a cargo box, which has doors.

Referring to FIG. 5 there is shown an isometric view of the spare tire holder 20 in downward position, which permits access to a cargo box 70. The illustrative cargo box 70 is attached to the vehicle and is further secured by the spare tire assembly 12 in an upright position. By way of example and not of limitation, the cargo box 70 is a metal box. The cargo box 70 is fastened to the vehicle bed using one or more bolts (not shown), which pass through the plastic body of the bed of the vehicle 10. The cargo box 70 has a lip 72 which interfaces with the side walls 74 of the vehicle 10. The cargo box 70 has at least one door 76. In the illustrative embodiment, there are two doors 76 and 78. The doors 76 and 78 can only be opened when the spare tire assembly 12 is rotated horizontally to a downward position. When the spare tire assembly 12 is in an upright position and the tailgate of the vehicle 10 is closed, the cargo box 70 is secured shut. A utility rack 80 may be attached to the top of cargo box 70. The utility rack 80 may be used to tie down equipment, carry gasoline, and any other such well-known uses for a utility rack.

Figure 6:
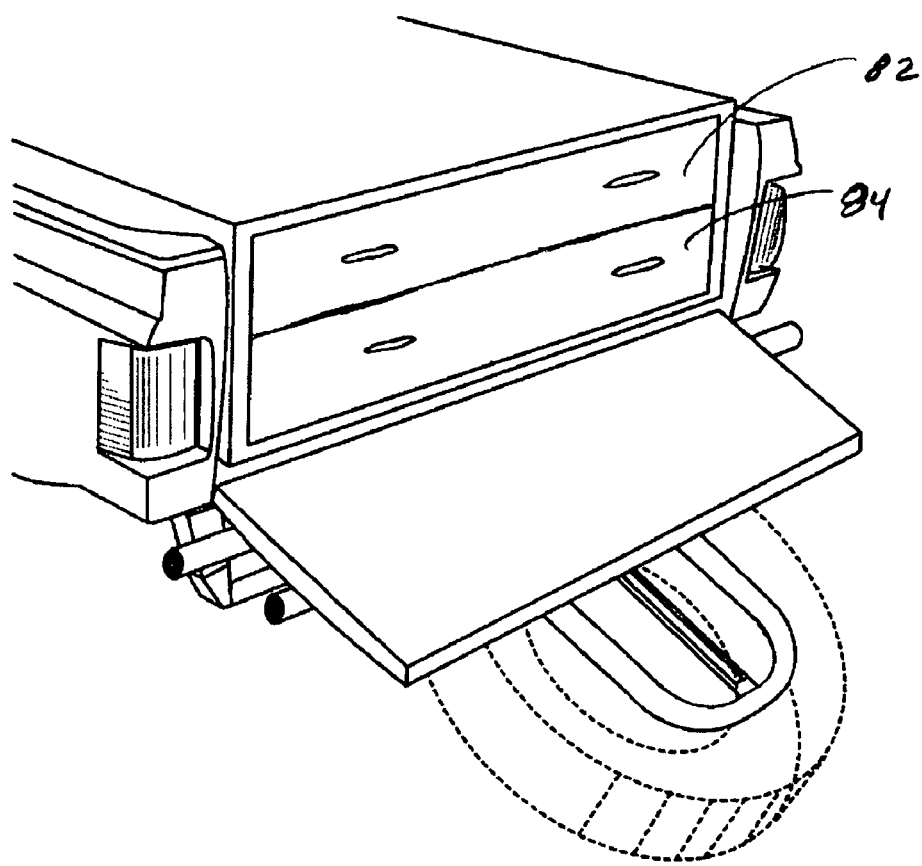
FIG. 6 shows an alternative cargo box, which has drawers.

Referring to FIG. 6, there is shown an alternative cargo box, which has drawers. The illustrative drawers 82 and 84 are also secured by the vehicle tailgate and the spare tire assembly 12. The drawers show an alternative cargo box design. It shall be appreciated by those of ordinary skill in the art that other cargo box designs may also be implemented.

Each of these cargo box designs must be robust enough to remain closed in off-road driving conditions.

It is to be understood that the foregoing is a detailed description of illustrative embodiments. The scope of the claims is not limited to these specific embodiments. Various elements, details, execution of any methods, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. An apparatus for carrying a spare tire that is configured to interface with a vehicle hitch, said apparatus comprising:
   a hitch receiver configured to interface with the vehicle hitch that is connected to the frame of a vehicle, wherein the hitch and the hitch receiver are configured to be fastened to one another;
   a bumper frame fixedly coupled to said hitch receiver, said bumper frame on a horizontal axis;
   a spare tire holder rotatably coupled to said bumper frame with two hinged elements that are configured to swing vertically about said horizontal axis, each of said hinged elements further comprising a first aperture that receives a locking pin that locks said spare tire holder in an upright position,
   each of said hinged elements configured to interface with a shaft, in which each shaft end includes a second aperture that is in alignment with the first aperture in the hinged elements;
   said locking pin configured to pass through the first aperture corresponding to the hinged element and the second aperture corresponding to the shaft when the spare tire holder is in the upright position, said locking pin in a substantially vertical position when the spare tire holder is in the upright position;
   a slotted plate coupled to the spare tire holder and the shaft, wherein the slotted plate includes a channel that is substantially vertical when the spare tire holder is in the upright position;
   an adjustable bolt configured to slidably interface with the slotted plate said adjustable bolt configured to receive different size spare tires;
   an adjust cone that interfaces with said adjustable bolt, said adjust cone configured to receive different sized wheels to secure said spare tire; and
   a nut adjacent the adjust cone and configured to receive the adjustable bolt to secure the spare tire to the spare tire holder.

2. The apparatus of claim 1 wherein said spare tire holder further comprises a plurality of tire rests fixedly coupled to said spare tire holder.

3. The apparatus of claim 1 wherein said hitch receiver has a plate, which is fastened to said bumper frame with a plurality of fasteners.

4. The apparatus of claim 1 wherein said spare tire holder further comprises a U-shaped member having a slotted plate, which interlaces with said adjustable bolt.

5. The apparatus of claim 1 wherein said spare tire holder is in a downward position when said locking pin is removed from said aperture within said hinged element.

6. The apparatus of claim 1 wherein said vehicle hitch is located on an all terrain vehicle having a hitch.

7. The apparatus of claim 6 wherein said bumper frame has a width which covers the width of said all terrain vehicle.

8. An apparatus for carrying a spare tire that is configured to interface with a vehicle hitch, said apparatus comprising:
   a means for fastening a hitch receiver to the vehicle hitch that is connected to the frame of a vehicle;
   a bumper frame fixedly coupled to said hitch receiver, said bumper frame on a horizontal axis;
   a means for rotatably coupling a spare tire holder to said bumper frame wherein said means for rotatably coupling said spare tire holder is configured to swing vertically about said horizontal axis;
   the spare tire holder rotatably coupled to said bumper frame with two hinged elements that are configured to swing vertically about said horizontal axis, each of said hinged elements further comprising a first aperture that receives a locking pin that locks said spare tire holder in an upright position,
   each of said hinged elements configured to interface with a shaft, in which each shaft end includes a second aperture that is in alignment with the first aperture in the hinged elements;
   said locking pin configured to pass through the first aperture corresponding to the hinged element and the second aperture corresponding to the shaft when the spare tire holder is in the upright position, said locking pin in a substantially vertical position when the spare tire holder is in the upright position;
   a slotted plate coupled to the spare tire holder and the shaft, wherein the slotted plate includes a channel that is substantially vertical when the spare tire holder is in the upright position;
   an adjustable bolt configured to slidably interface with the slotted plate said adjustable bolt configured to receive different size spare tires;
   an adjust cone that interfaces with said adjustable bolt, said adjust cone configured to receive different sized wheels to secure said spare tire; and
   a nut adjacent to the adjust cone and configured to receive the adjustable bolt to secure the spare tire to the spare tire holder.

9. The apparatus of claim 8 wherein said spare tire holder further comprises a plurality of tire rests fixedly coupled to said spare tire holder.

10. The apparatus of claim 8 wherein said spare tire holder comprises a U-shaped member having a slotted plate.

11. The apparatus of claim 8 wherein said spare tire holder is in a downward position when said means for locking said spare tire holder is removed.

12. The apparatus of claim 8 wherein said vehicle hitch is located on an all terrain vehicle having a hitch.

13. The apparatus of claim 12 wherein said bumper frame has a width which covers the width of said all terrain vehicle.

14. An apparatus for carrying a spare tire and other supplies, comprising:
   a hitch receiver configured to interface with a vehicle hitch, said hitch receiver coupled to a frame of a vehicle, wherein the vehicle hitch and the hitch receiver are configured to be fastened to one another;
   a bumper frame fixedly coupled to said hitch receiver, said bumper frame on a horizontal axis;
   a means for rotatably coupling a spare tire holder to said bumper frame wherein said means for rotatably coupling said spare tire holder is configured to swing vertically about said horizontal axis;
   the spare tire holder rotatably coupled to said bumper frame with two hinged elements that are configured to swing vertically about said horizontal axis, each of said hinged element further comprising a first aperture that receives a locking pin that locks said spare tire holder in an upright position, each of said hinged elements configured to interface with a shaft, in which each shaft end includes a second aperture that is in alignment with the first aperture in the hinged elements;

said locking pin configured to pass through the first aperture corresponding to the hinged element and the second aperture corresponding to the shaft when the spare tire holder is in the upright position, said locking pin in a substantially vertical position when the spare tire holder is in the upright position;

a slotted plate coupled to the spare tire holder and the shaft, wherein the slotted plate includes a channel that is substantially vertical when the spare tire holder is in the upright position;

an adjustable bolt configured to slidably interface with the slotted plate said adjustable bolt configured to receive different size spare tires;

an adjust cone that interfaces with said adjustable bolt, said adjust cone configured to receive different sized wheels to secure said spare tire;

a nut adjacent the adjust cone and configured to receive the adjustable bolt to secure the spare tire to the spare tire holder; and a cargo box configured to interface with a vehicle bed, said cargo box configured to be accessible when said spare tire holder is in a downward position.

15. The apparatus of claim 14 wherein said vehicle hitch is located on an all terrain vehicle having a hitch.

16. The apparatus of claim 15 wherein said cargo box has a lip that interfaces with the side walls of said all terrain vehicle.

17. The apparatus of claim 14 wherein said spare tire holder is in a downward position when said locking pin is removed from said aperture within said hinged element.

18. The apparatus of claim 17 wherein said cargo box comprises a utility rack located on top of said cargo box.

19. The apparatus of claim 17 wherein said cargo box comprises at least one door.

20. The apparatus of claim 17 wherein said cargo box comprises at least one drawer.

* * * * *